(12) United States Patent
Hull et al.

(10) Patent No.: US 6,671,684 B1
(45) Date of Patent: Dec. 30, 2003

(54) METHOD AND APPARATUS FOR SIMULTANEOUS HIGHLIGHTING OF A PHYSICAL VERSION OF A DOCUMENT AND AN ELECTRONIC VERSION OF A DOCUMENT

(75) Inventors: Jonathan J. Hull, San Carlos, CA (US); Dar-Shyang Lee, Union City, CA (US)

(73) Assignee: Ricoh Co., Ltd., Tokyo (JP)

( * ) Notice: Subject to any disclaimer, the term of this patent is extended or adjusted under 35 U.S.C. 154(b) by 332 days.

(21) Appl. No.: 09/653,965

(22) Filed: Sep. 1, 2000

(51) Int. Cl.[7] .............................................. G06F 17/30
(52) U.S. Cl. ........................................................ 707/6
(58) Field of Search .............................. 707/2, 500, 6, 707/512, 530; 178/18.03; 358/468; 345/173, 428, 764; 382/186, 219, 309; 399/6

(56) References Cited

U.S. PATENT DOCUMENTS

| | | | |
|---|---|---|---|
| 5,243,149 A | * 9/1993 | Comerford et al. | 178/18.03 |
| RE34,476 E | * 12/1993 | Norwood | 345/173 |
| 5,583,980 A | 12/1996 | Anderson | |
| 5,625,833 A | 4/1997 | Levine et al. | |
| 5,692,073 A | * 11/1997 | Cass | 358/468 |
| 5,768,607 A | 6/1998 | Drews et al. | |
| 5,832,474 A | * 11/1998 | Lopresti et al. | 382/309 |
| 5,893,126 A | 4/1999 | Drews et al. | |
| 5,920,694 A | 7/1999 | Carleton et al. | |
| 5,970,455 A | 10/1999 | Wilcox et al. | |
| 6,369,811 B1 | * 4/2002 | Graham et al. | 345/764 |

OTHER PUBLICATIONS

Toshifumi Arai, Dietmar Aust and Scott E. Hudson, "Paper-Link: A Technique for Hyperlinking from Real Paper to Electronic Content," Proceedings of CHI'97.

J. Jacobson, B. Comiskey, C. Turner, J. Albert and P. Tsao, "The Last Book", IBM Systems Journal, vol. 36, No.3, 1997, pp. 457–463.

Chris Kasabach, Chris Pacione, John Stivoric, Francine Gemperle and Dan Siewiorek, "Digital Ink: A Familiar Idea with Technological Might!, " Companion Proceedings of CHI'98, pp. 175–176.

Mario E. Munich and Petro Perona, "Visual Input for Pen–Based Computers," Proceedings of ICPR '96, 1996, pp. 33–37.

Shinji Nabeshima, Shinichirou Yamamoto, Kiyoshi Agusa and Toshio Taguchi, Memo–Pen: A New Input Device, CHI'95, 1995, pp. 256–257.

Morgan N. Price, Gene Golovchinsky and Bill N. Schilit, "Linking by Inking: Trailblazing in a Paper–link Hypertext," Proceedings of Hypertext '98, pp. 20–24, 1998.

Bill N. Schilit, Gene Golovchinsky and Morgan N. Price, "Beyond Paper: Supporting Active Reading with Free Form Digital Ink Annotation," Proceedings of CHI'98, 1998, pp. 249–256.

(List continued on next page.)

Primary Examiner—Diane D. Mizrahi
Assistant Examiner—Apu M Mofiz
(74) Attorney, Agent, or Firm—Blakely, Sokoloff, Taylor & Zafman LLP

(57) ABSTRACT

A method and an apparatus for simultaneous highlighting of a paper document is described. The device includes a highlighter. A scanner is used and configured to capture at least one highlighted mark place on a paper document. The scanner is coupled to a memory for storing electronic versions of documents. An electronic document is accessed when a portion of the electronic document matches a portion of the paper document.

20 Claims, 6 Drawing Sheets

OTHER PUBLICATIONS

N.K. Sheridon and M.A. Berkovitz, "The Gyricon –A Twisting Ball Display," Proceedings of the Society for Information Display, Boston, MA (May 1977), pp. 289–293.

Lisa J. Stifelman, "Augmenting Real–World Objects: A Paper–Based Audio Notebook," Proceedings of CHI '96, 1996, pp. 199–200.

David Stork, "Method and Apparatus for Optically Sensing Pen Motion," CRC–TR9707.

Steve Whittaker, Patric Hyland and Myrtle Wiley, "Filochat: Handwritten Notes provide Access to Recorded Conversation," Proceedings of CHI'94, 1994, pp. 271–276.

Lynn D. Wilcox, Bill N. Schilit and Nitin Nick Sawhney, "Dynomite" A Dynamically Organized Ink and Audio Notebook, Proceedings of CHI'97, 1997, pp. 186–193.

* cited by examiner

| HIGHLIGHT # | | | | | |
|---|---|---|---|---|---|
| 1 | 2 | 3 | 4 | 5 | 6 |

DOC. A: (30), (25, 36, 89), (8, 12, 49), (51), (3, 6, 12, 29, 32, 40, 41, 43, 55, 78, 91), (58, 71)

| HIGHLIGHT # | | | | | |
|---|---|---|---|---|---|
| 1 | 2 | 3 | 4 | 5 | 6 |

DOC. B: (4, 8, 91), (32), (1, 7), (21, 33, 58), (∅), (1, 8)

FIG. 3

METHOD AND APPARATUS FOR SIMULTANEOUS HIGHLIGHTING OF A PHYSICAL VERSION OF A DOCUMENT AND AN ELECTRONIC VERSION OF A DOCUMENT

FIELD OF THE INVENTION

This invention relates to scanning of a physical version (e.g., paper) of a document and more particularly to recording annotations made to a physical version of a document onto an electronic version of the document.

DESCRIPTION OF RELATED ART

Although individuals are increasingly using electronic documents in place of paper documents, some users still prefer to read and annotate paper documents for a variety of reasons. For example, some users are more comfortable using a paper document instead of an electronic document for editing purposes. Other reasons relate to the numerous advantages of using a paper document. Such advantages include the high-resolution associated with a paper document, the portability of the paper document, the ease of copying the paper document, and the ease of editing or adding annotations to a paper document. Additionally, annotating a paper document does not require a power source which is required to directly annotate an electronic document.

Annotations that are generally made to a paper document include a printed annotation, a written annotation, a colored marking, a sound, and an image. Colored markings include highlights that are applied over the top of a machine-printed text.

Pen scanners are capable of recording marks made to a paper document. Pen scanners are electronic devices used to record the path followed by a pen when a user writes or prints text or images on a paper document. Such pen scanners may include a pen with a video camera focused on a desktop or a paper document, a pen having an imbedded gyroscope to facilitate recording pen movements, or a pen having a small video camera focused on the tip of the pen scanner.

Pen scanners, however, have not been used, for example, to scan colored markings such as highlights. Although highlighted marks may be captured by a video camera, conventional systems do not provide for automatically mapping highlighted marks onto an electronic document.

Another disadvantage to these conventional systems is that a user must manually access an electronic version of a document to make additional annotations to the document. It is therefore desirable to have a system for automatically preserving annotations, such as, for example, highlighted marks, that are made to a paper document and provides effective ways of accessing an electronic version of a document and electronically annotating a document automatically.

SUMMARY OF THE INVENTION

A method and apparatus for preserving highlighted marks made to a paper document is disclosed. In one embodiment, a method for annotating a paper document comprises annotating a portion of a paper document by highlighting, performing a recognition on text in the highlighted portion of the paper document, accessing an electronic version of the paper document from a memory based on recognition results, matching information in the electronic version, and storing an indication of at least one highlighted mark with the electronic version of the paper document.

BRIEF DESCRIPTION OF THE DRAWINGS

The features, aspects, and advantages of the invention will become more thoroughly apparent from the following detailed description, appended claims, and accompanying drawings in which:

FIG. 3 illustrates representative chains of highlights and their associated values;

DETAILED DESCRIPTION OF THE INVENTION

Figure 1:
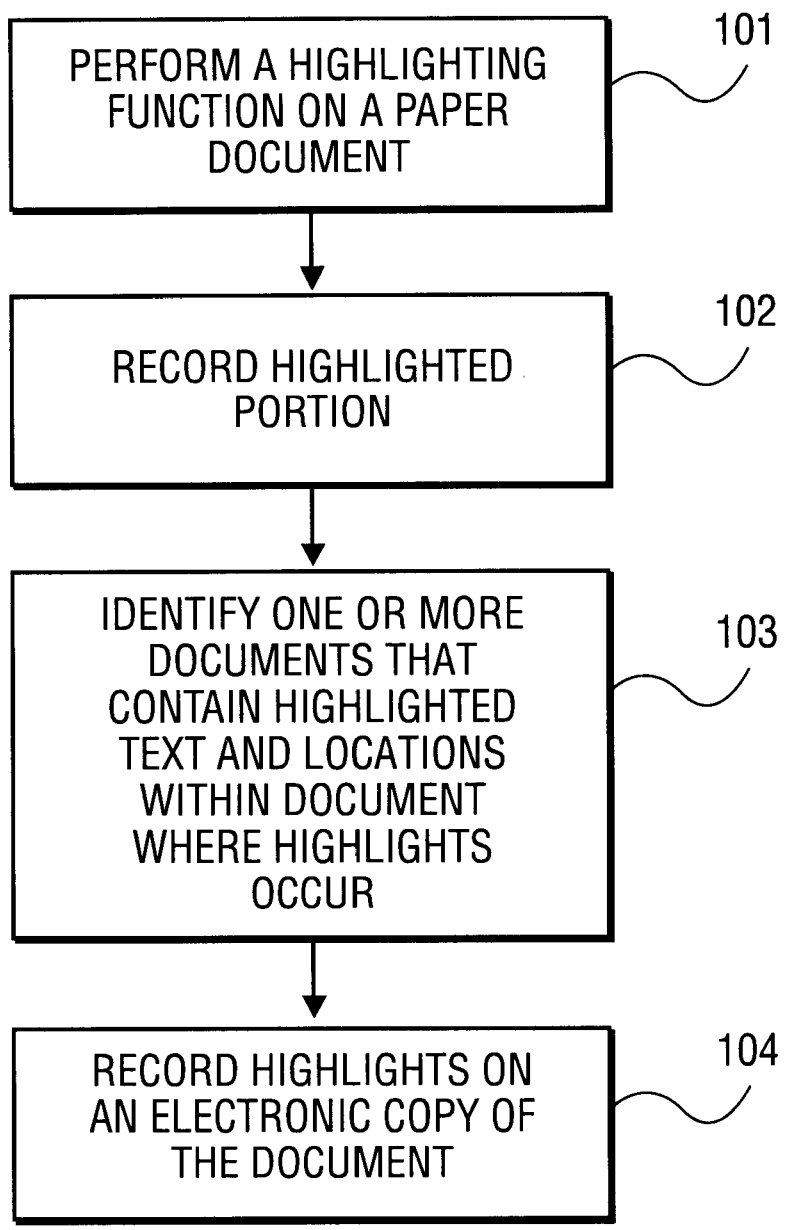
FIG. 1 is a flow diagram of one embodiment of a process for highlighting a portion of a document.

In accordance with one embodiment of the invention, a device is disclosed that records annotations (e.g., highlighting) made to a paper document, performing recognition on the information in the annotated portion of the document, an electronic version of the paper document, and storing the annotations, such as highlighted marks placed on a paper document, with the electronic version of the document.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), erasable programmable read only memories ("EPROMs"), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes ROM; RAM; magnetic disk storage media; optical storage media; flash memory devices; electrical, optical, acoustical or other form of propagated signals (e.g., carrier waves, infrared signals, digital signals, etc.); etc.

Overview

The present invention provides for simultaneously highlighting paper and electronic documents. The results of the process are to map images of highlighted text onto electronic documents. FIG. 1 illustrates one embodiment of the process for simultaneously highlighting paper and electronic document. The process is performed by processing logic that may comprise hardware (e.g., dedicated logic), software (such as runs on a general purpose computer system or a dedicated machine), or a combination of both.

Referring to FIG. 1, the process begins by processing logic performing a highlighting function on a paper document with a highlighting pen having a camera focused on its tip (processing block 101). Processing logic associated with the camera records what is highlighted prior to (or substantially simultaneously with) ink from the highlighting pen being placed on and obscuring the document (processing block 102). Processing logic identifies one or more documents that contain highlighted text and identifies locations within those documents where the highlights occur (processing block 103). Processing logic records the highlights on an electronic copy of the document (processing block 104). The process utilizes a database containing an electronic copy of the paper document to facilitate the recording (and storing) portion of the process.

Figure 2:
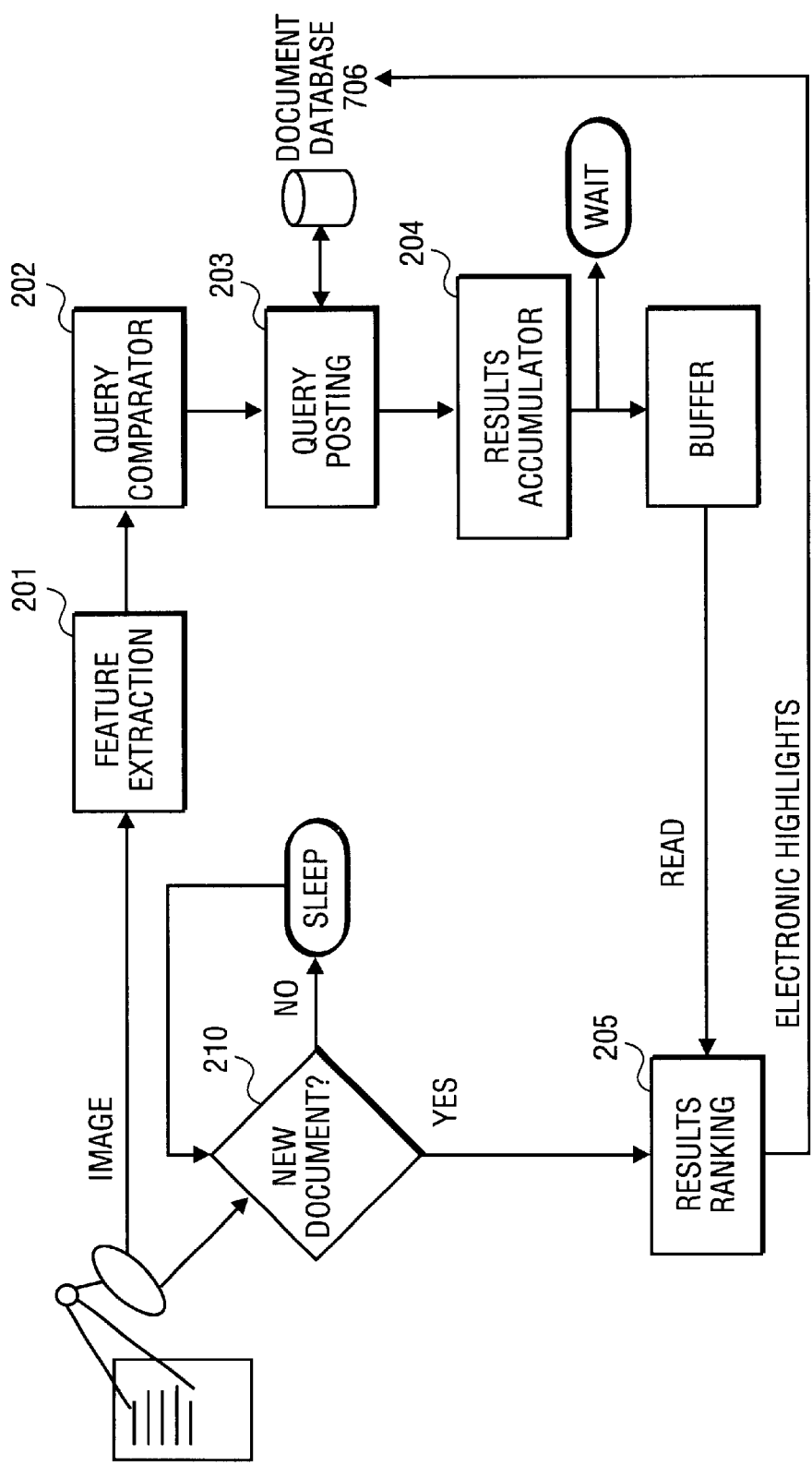
FIG. 2 is a more detailed flow diagram of one, embodiment of a process for highlighting a portion of a document.

FIG. 2 illustrates a more detailed flow diagram of the process of mapping images of highlighted text onto electronic documents. The process is performed by processing logic that may comprise hardware (e.g., dedicated logic), software (such as runs on a general purpose computer system or a dedicated machine), or a combination of both. Referring to FIG. 2, the process begins with processing logic extracting features from the highlighted text (processing block 201). Feature extraction may include, for example, performing optical character recognition (OCR), performing word shape analysis, or performing an extraction of characteristics based on black and white components in the highlighted portion. Next, processing logic composes a query using the features (processing block 202). Using the query, processing logic posts the query (processing block 203).

In one embodiment, posting the query comprises receiving the queries sequentially and time-stamping them. A time out value may be used to split a sequence of queries into groups, with each group being from the same document. Posting the query also comprises applying the query to an unedited index. In response to posting the query, processing logic obtains a list of documents that contain the query and locations within each document where the query occurred. In one embodiment, the locations within each document where the query occurred are expressed as byte offsets.

After posting the query, processing logic performs results accumulation (processing block 204). In results accumulation, the lists of documents returned by queries in a group are "accumulated." Ideally, each query would return a single document, but the presence of duplicates, versions, or just documents with common text strings will more than likely cause this not to be true. In one embodiment, processing logic increments a counter for each document that contains a query and records the location(s) within the document.where the query was found. The results are accumulated in a buffer.

After processing the queries in a group, the documents with highest number of times different highlighted words are located in documents are most likely to have been the ones highlighted by the user. In one embodiment, the number of times that highlighted words are located in documents is set by a threshold. If none are chosen (of achieved<threshold), then processing logic assumes that the user must have highlighted a document not in the database.

The presence of a new document, and thus a new group, may be automatically indicated in a number of ways. In one embodiment, a button on the pen may be pressed to indicate a new document. In another embodiment, a time out value may be used to indicate a new document is being processed. In such a case, if the pen has not processed any new information and the time out period expires, then the end of a document, and start of a new document, is indicated. In another embodiment, the pen can have a gyro that indicates that the pen has been in one location for a predetermined period of time, thereby indicating that the user has finished with the current document.

After performing results accumulation, processing logic performs results ranking (processing logic 205). The ranking process assigns a score that measures the "sequentialness" of the sequence of highlights applied to a document. The document with the lowest score is most likely to be the one that contained the highlights.

In one embodiment, a dynamic programming solution is used to perform the results ranking. The dynamic programming solution computes a "chain" of highlights that is the preferred chain of highlights and computes a score. For example, FIG. 3 shows the sequence of highlights applied to two documents A and B. The starting positions within the documents where the corresponding highlighted text occurs are shown. For example, in document A the second highlighted text phrase occurs in positions 25, 36, and 89. The dynamic programming algorithm processes the highlighted phrases sequentially. At each step it selects the starting position closest to the starting position of the previous highlighted phrase but after it. If it cannot select such a phrase it backtracks and deselects the most recent previous phrase for which there is an alternative with a smaller starting position. It substitutes that alternative and continues. Search strategies such as this are commonly known in art as depth first.

A score is assigned to each highlight as the distance backward from the starting position of the previous highlight. The "sequentialness" score is the sum of these values for a given document. In FIG. 3, the sequence 30-36-49-51-55-58 is chosen for document A. Its score is zero. The sequence 8-32-7-21-NULL-8 is chosen for document B. Its score is 25+100+13 or 138. A default value of 100 is assigned for the fifth highlight since it was not found in document B. In this case, document A is the most likely one that contained the highlights.

In one embodiment, the output of results ranking is a set of documents, a score, a preferred list of highlights for each document.

After performing results ranking, processing logic performs a database update (processing logic 706). When performing the database update, processing logic records in the document database, for each document identified by ranking, the preferred list of highlights together with the times when those highlights were originally applied.

An Exemplary Pen

The pen used in the highlighting process can be online (connected "live with the database) or offline. When online, the database can indicate to the pen when it locates a unique document (e.g., results accumulation has found a stable set of documents). When offline, images of highlighted text (or features, or queries) are accumulated on the pen together with their creation timestamps. The accumulated data is later downloaded to a database update (results accumulation and ranking) process.

The inverted index could also be present on the pen. This would allow for iterative feedback to the user as if the user is using the pen in online mode. Thus, the results accumulation process could be performed on the pen.

In one embodiment, the pen has on/off, highlight on/off and new document indication buttons. The new document button is clicked when a user starts highlighting a new document. For example, referring back to FIG. 2, processing tests whether the user selects the new document button (processing block 210). If the new document button hasn't been selected, then the results ranking processing remains inactive and loops back to the beginning of processing block 210. If the new document button has been selected, processing logic begins to perform results ranking on the information from the previous document.

Ambiguous highlights are highlights that are not on a preferred chain or that map onto a document not selected by results ranking. In one embodiment, these are also recorded together with their timestamp and a pointer to the documents that were chosen by results ranking.

An Exemplary System

Figure 4:
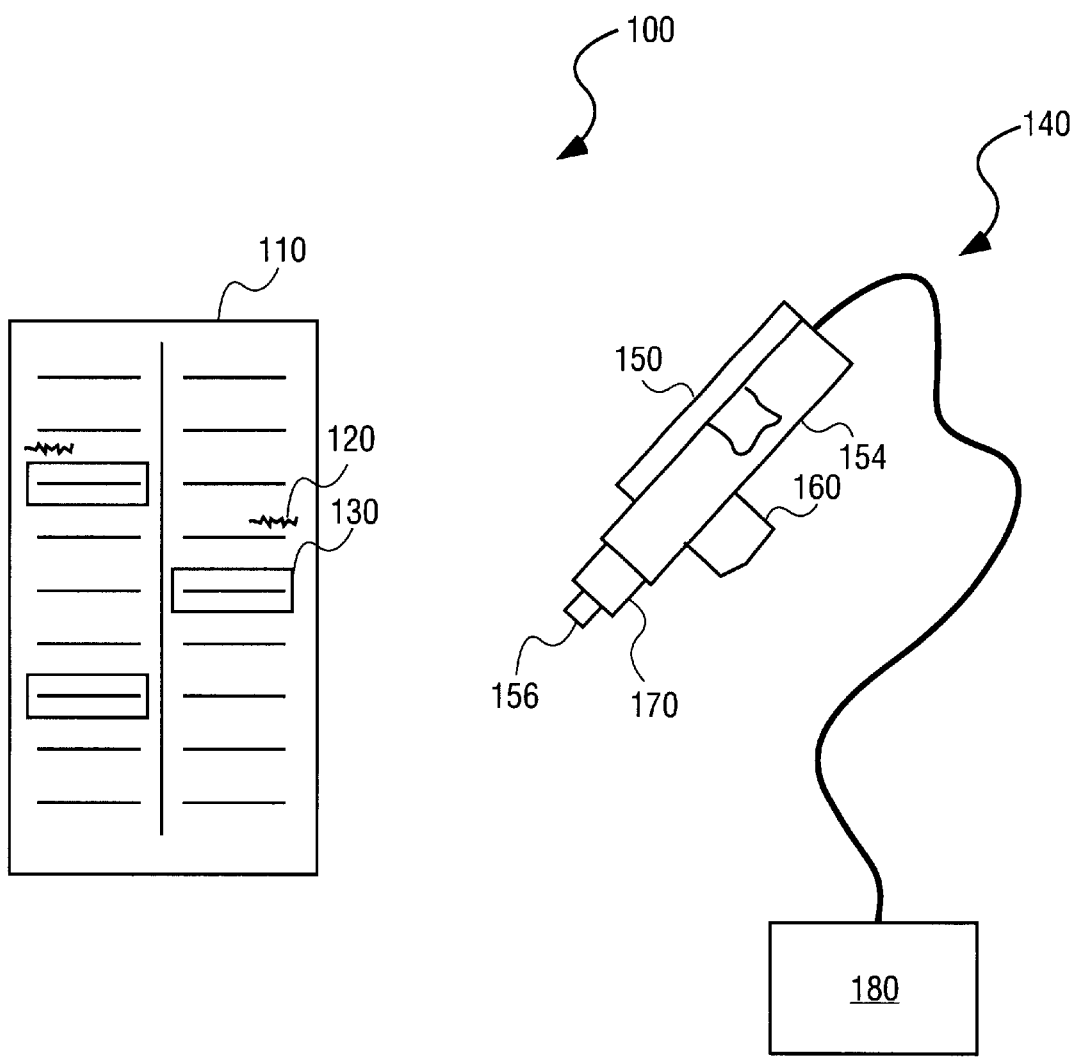
FIG. 4 illustrates one embodiment of an annotation system that includes an annotation device and a multi-function machine.

FIG. 4 illustrates one embodiment of an annotation system. Referring to FIG. 4, annotation system 100 comprises annotation device 140 and multi-function machine 180 such as computer system 10 described in FIG. 5. It will be appreciated that multi-function machine 180 may comprise devices such as a portable palm pilot and other suitable devices. A physical document (e.g., paper document) 110 includes a colored annotation 130 such as a mark left by a highlighter. One embodiment of annotation device 140 includes highlighter 154 and scanner 150 which includes a video camera coupled to highlighter 154 by a clip. The video camera may be located close to paper document 110 such as within one inch of the distance for recording visual marks, text, or images on the paper document.

In one embodiment, annotation system 100 also includes microphone 160 for recording sound, marker tip 170 for placing highlighted marks on the paper document, and micro switch 152 for activating tip switch 155. Tip switch 155 is used when a user wishes to a capture or "pick up" marks, images, patterns, words or other marks on a paper document. In one embodiment, scanner 150 is attached to a frame capture card (not shown) in a multifunction machine such as computer system 10 illustrated in FIG. 6 and tip switch 155 is wired to the switch of an input device button.

Annotation device 140 allows marks to be made on a paper document either through using a highlighter, a standard pen, or other suitable marking utensil. These marks or annotations may then be associated with electronic content and/or are assigned a meaning using processing such as, for example, optical character recognition ("OCR") and/or word shape analysis. OCR and word shape analysis are used to scan in text, such as printed text or written text, and determine characters or other information in the scanned in text. That is, the OCR processing and the word shape processing process the text or image data. OCR processing determines the text that is being captured by the video camera. Word shape processing determines the shape of characters that have been highlighted. Once one or more characters are determined, the entire word may be identified. This data is optionally stored in data repository (block 330) as document identifiers. These functions are performed by a feature extraction processing block.

Figure 5:
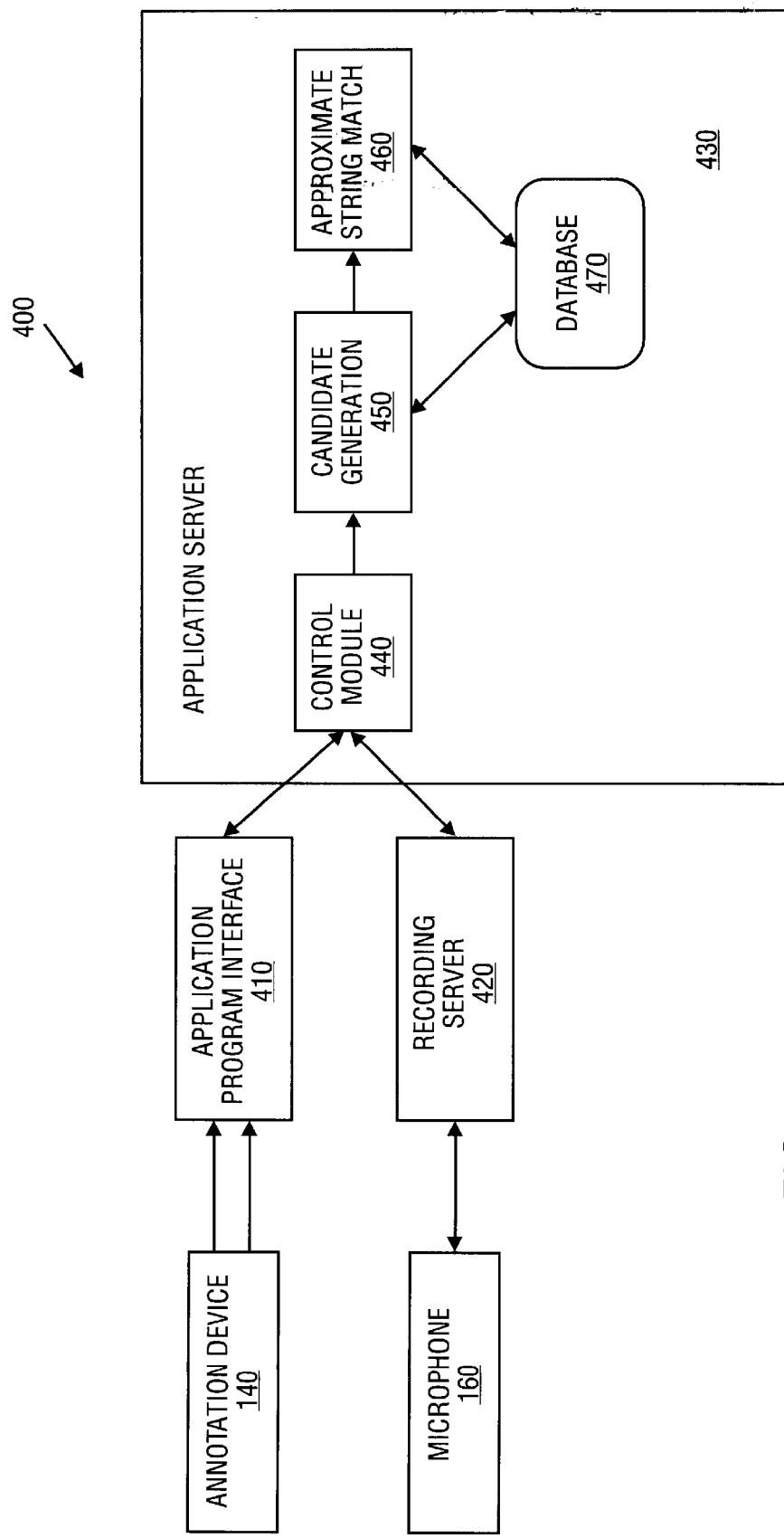
FIG. 5 illustrates another embodiment of an annotation system.

FIG. 5 illustrates another embodiment of an annotation system 400. Referring to FIG. 5, annotation device 140 transmits data to application program interface 410. Application program interface 410 is a connection point at which information is transmitted between annotation device 140 and application server 430. Data from application program interface 410 is received by control module 440. Control module 440 controls the operation of application program interface 410 and recording server 420. Candidate generation 450 then receives the data from control module 440. Candidate generation 450 takes the data received from control module 440 and generates a set of document candidates that may contain text or images that resembles the text or images scanned from the paper document by annotation device 140. This data is then sent to approximate string match 460 that attempts to match the string of text scanned in with.strings of text that are stored in candidate documents 470. It will be appreciated that candidate generation 450 and approximate string match 460 are connected to database 470 to access various portions of documents, characters, images or other suitable visual indicia.

The manner in which annotations such as highlighted marks are identified may depend upon whether the annotation is stored in memory. For example, an image may, be stored in the memory of multifunction machine 180 as a hyperlink. Therefore, an image captured by annotation device 140 that substantially or precisely matches an image stored in the memory of multifunction machine 180 is recorded as being located, for example, in a certain section of a page of a document. Captured image data that is not recognized as a hyperlink mark can optionally have its corresponding image text extracted. This image data can then serve as a parameter to a command or otherwise be used as input data. This provides an, advantage related to recording page numbers that allows annotation device 140 to provide an electronic-to-paper hyperlinking and indexing mechanism.

The highlighted area may cover annotations, printed text, or other marks. Annotations may include written annotations, printed annotations, colored markings, images, sound, or other visual indicia. Regarding the, colored marking, the highlighter such as a yellow highlighter may cover a colored marking such as blue highlighted area or a green marked area.

It will be appreciated that the phrases from the scanned paper document may be randomly selected or selected based upon specified instructions. These phrases are then used as queries to the text index for the electronic documents stored in the database (e.g., a data repository). The number of documents returned by each query, individually and in common, may then be calculated. Based upon this information, it may be, estimated the number of words, characters, images or other suitable objects needed to identify a unique electronic document. Table 1 indicates in general the performance of phrase matching using the number of phrases and number of words per phrase.

TABLE 1

Performance of Phrase Matching

| Number of phrases | Number of words per phrase | | | |
|---|---|---|---|---|
| | 3 | 4 | 5 | 6 |
| 1 | 29% | 35% | 38% | 39% |
| | 65 | 52 | 28 | 27 |
| 2 | 42% | 45% | 45% | 46% |
| | 21 | 16 | 10 | 9 |
| 3 | 47% | 48% | 49% | 49% |
| | 9 | 8 | 6 | 6 |
| 4 | 50% | 50% | 52% | 52% |
| | 6 | 6 | 5 | 4 |

Alternatively, on the first pass through the process described herein, if more than one electronic document is identified, additional images or text from the paper document may be scanned in order to obtain a single unique document. Duplicate documents are those documents in which a percent of unique vocabulary in common exceeds a specified threshold. The amount of duplicate documents recognized may be reduced by the design of the user interface on the highlighting scanner or at retrieval time. Additionally, the process may be performed such that if more than one version of an electronic document is stored into a data repository, the latest version of the electronic document is automatically accessed.

The data repository receives the resulting data from optical character recognition processing. Upon receipt, the data repository sends the data to the dictionary (block 350) to determine whether the word at issue is within the dictionary. If it is, a match is indicated. If not, processing logic looks to the word shape analysis processing block 320 for the result of its operation on the highlighted word or image.

It will be appreciated that annotation system 100 may use a variety of program instructions but in particular, the image capture, pattern recognition, and other functional components of the annotation system 100 are generally coded in C++ with a commercial OCR software package being used to recognize words picked up from the paper document.

Figure 6:
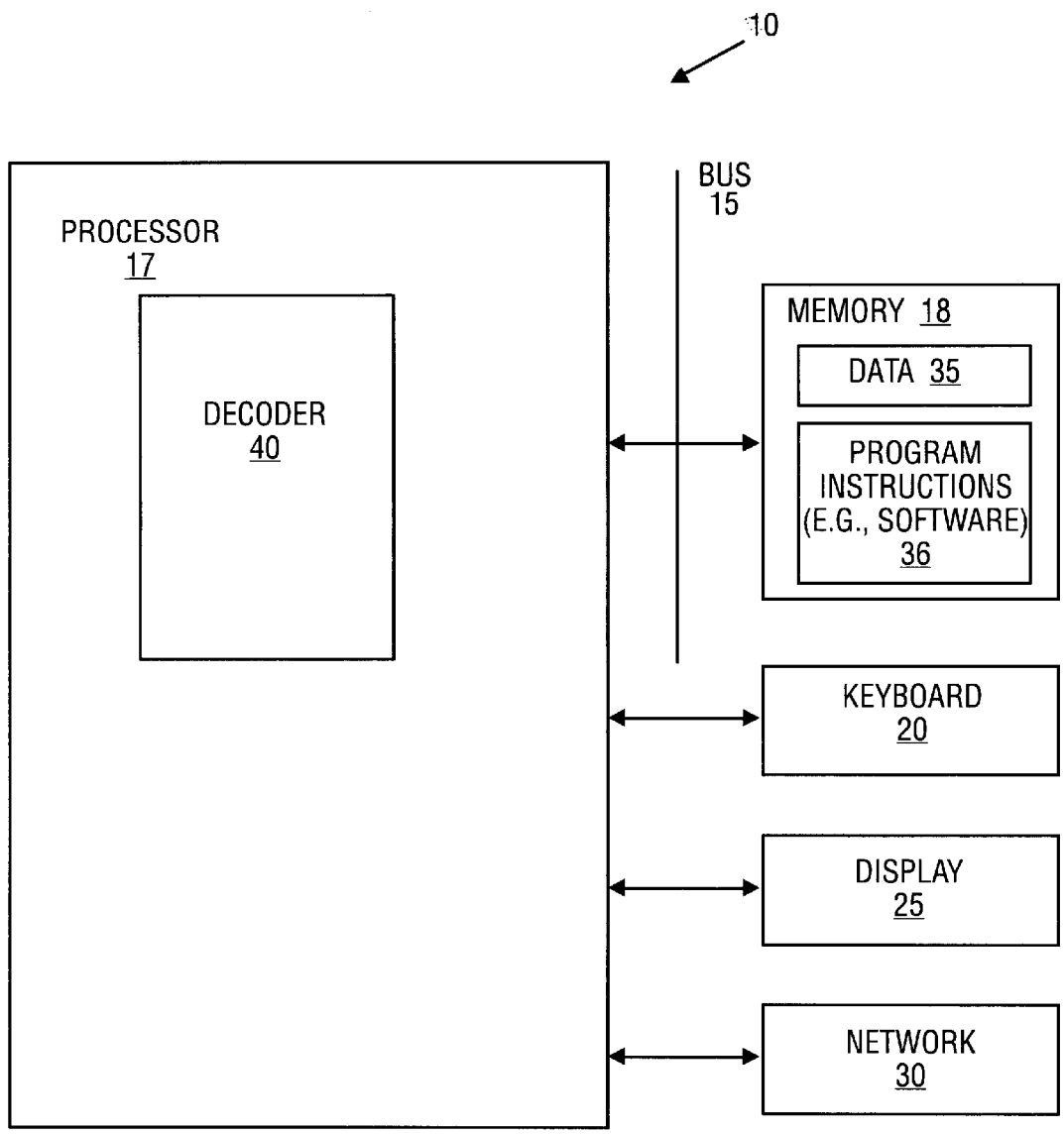
FIG. 6 illustrates one embodiment of a computer system.

FIG. 6 illustrates one embodiment of a computer system that performs operations described above. Referring to FIG. 6, computer system 10 comprises processor 17, memory 18, and bus 15 such as bus or a point-to-point link. Processor 17 is coupled to the memory 18 by bus 15. In addition, a number of user input/output devices, such as a keyboard 20 and a display 25, are coupled to chip set (not shown) which is then connected to processor 17. The chipset (not shown) is typically connected to processor 17 using a bus that is different from bus 15.

Processor 17 represents a central processing unit of any type of architecture (e.g., the Intel architecture, Hewlett Packard architecture, Sun Microsystems architecture, IBM architecture, hybrid architecture, etc.). In addition, processor 17 could be implemented on one or more chips. Memory 18 represents one or more mechanisms for storing data such as the number of times the second code is checked and the results of checking the second code. Memory 18 may include ROM, RAM, magnetic disk storage mediums, optical storage mediums, flash memory devices, and/or other machine-readable mediums. In one example, bus 15 may comprise one or more buses (e.g., accelerated graphics port bus, peripheral component interconnect bus, industry standard architecture bus, X-Bus, video electronics standards association related to buses, etc.) and bridges (also termed as bus controllers).

While this embodiment is described in relation to a single processor computer system, the operations described herein could be implemented in a multi-processor computer system. In addition to other devices, one or more of a network 30 may be present. Network 30 represents one or more network connections for transmitting data over a machine readable media. Certain operations could also be implemented on multiple computers connected through such a network.

FIG. 6 also illustrates that memory 18 has stored therein data 35 and program instructions (e.g. software, computer program, etc.) 36. Data 35 represents data stored in one or more of the formats described herein. Program instructions 36 represents the necessary code for performing any and/or all of the techniques described with reference to FIGS. 1–2. It will be recognized by one of ordinary skill in the art that the memory 18 preferably contains additional software (not shown), which is not necessary to understanding the invention.

FIG. 5 additionally illustrates that the processor 17 includes decoder 40. Decoder 40 is used for decoding instructions received by processor 17 into control signals and/or microcode entry points. In response to these control signals and/or microcode entry points, decoder 40 performs the appropriate operations.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising:

annotating a portion of a paper document by highlighting;

performing recognition on text in the highlighted portion of the paper document;

accessing an electronic version of the paper document from a memory based on recognition results matching information in the electronic version; and storing an indication of at least one highlighted mark with the electronic version of the paper document.

2. The method of claim 1, further comprising:

identifying the electronic version of the paper document by matching at least one scanned image with an image in the electronic version of the document.

3. The method of claim 1, wherein the annotation comprises one of a group that includes at least a printed annotation, a written annotation, a colored marking, a sound, a highlighted mark and an image.

4. The method of claim 1, further comprising:

mapping the at least one highlighted mark onto the electronic version of the document.

5. The method of claim 3, further comprising determining by a word shape analysis module at least one characteristic of a character in the annotation.

6. The method of claim 1, further comprising recording audio concurrently with the annotation.

7. A system for preserving at least one highlighted mark on a paper document comprising:

a highlighter;

a scanner configured to capture at least one of a plurality of characters, an image, and at least one highlighted mark placed on a paper document by the highlighter; and a memory coupled to the scanner and the processor for storing an electronic version of the document with the highlighted mark, the memory permitting access to the electronic version of the paper document using a scanner to identify at least a portion of the electronic document.

8. The system of claim 7, wherein the memory permits access to the electronic version of the document using one of optical character recognition and word shape analysis.

9. The system of claim 7, wherein the annotation is one from a group that includes a printed annotation, a written annotation, a colored marking, a sound, and an image.

10. The system of claim 7, wherein the scanner directly maps the highlighted mark onto the electronic version of the document.

11. The system of claim 7, further comprising a word shape analysis module for determining at least one characteristic of a character in the printed document.

12. The system of claim 11, wherein the word shape analysis module is coupled to a dictionary that matches at least one word shape.

13. The system of claim 7, wherein the scanner is coupled to a microphone to capture audio information.

14. An apparatus comprising:

means for annotating at least a portion of a paper document;

means for performing recognition on text in the highlighted portion of the paper document;

means for accessing an electronic version of the paper document from a memory based on recognition results matching information in the electronic version; and means for storing an indication of at least one highlighted mark with the electronic version of the paper document.

15. The apparatus of claim 14, wherein the annotation comprises at least one of a group that includes a printed annotation, a written annotation, a colored marking, a sound, a highlighted mark and an image.

16. The apparatus of claim 14, further comprising means for identifying the electronic version of the paper document by matching at least one scanned image with an image in the electronic version of the document.

17. The apparatus of claim 14, further comprising means for mapping the at least one highlighted mark onto the electronic version of the document.

18. The apparatus of claim 14, further comprising means for recording audio concurrently with the annotation.

19. An article of manufacture having one or more recordable media having a plurality of executable instructions stored thereon which, when executed by a processing device, cause the processing device to:

annotate a portion of a paper document by highlighting;

perform recognition on text in the highlighted portion of the paper document;

access an electronic version of the paper document from a memory based on recognition results matching information in the electronic version; and store an indication of at least one highlighted mark with the electronic version of the paper document.

20. The article of manufacture of claim 19, wherein the annotation is at least one of a group including one of a printed annotation, a written annotation, a colored marking, a sound, and an image.

* * * * *